(12) United States Patent
Gaskell

(10) Patent No.: US 7,576,301 B2
(45) Date of Patent: Aug. 18, 2009

(54) BUILDING INCORPORATING A THERMAL INSULATION ASSEMBLY AND METHOD OF CONSERVING ENERGY

(75) Inventor: Christopher Norman Gaskell, Birmingham (GB)

(73) Assignee: FreeGEN Research Limited (GB)

( * ) Notice: Subject to any disclaimer, the term of this patent is extended or adjusted under 35 U.S.C. 154(b) by 0 days.

(21) Appl. No.: 10/952,507

(22) Filed: Sep. 28, 2004

(65) Prior Publication Data

US 2006/0081584 A1    Apr. 20, 2006

(51) Int. Cl.
- H05B 1/02    (2006.01)
- H05B 3/20    (2006.01)
- F24D 13/02   (2006.01)

(52) U.S. Cl. .................. 219/203; 219/494; 219/522; 219/531; 219/542; 392/370; 392/371; 392/432; 392/436

(58) Field of Classification Search .......... 219/200, 219/201, 213, 520, 522, 531, 532, 538, 542; 392/347, 371, 363, 370, 407, 432, 435, 436
See application file for complete search history.

(56) References Cited

U.S. PATENT DOCUMENTS

| | | | | | |
|---|---|---|---|---|---|
| 2,504,146 | A | * | 4/1950 | Mossin | 338/254 |
| 2,778,901 | A | * | 1/1957 | Cunningham | 337/386 |
| 3,060,300 | A | * | 10/1962 | Horner | 392/439 |
| 3,179,544 | A | * | 4/1965 | Smith-Johannsen | 156/55 |
| 3,546,432 | A | * | 12/1970 | Eisler | 392/436 |
| 3,567,353 | A | * | 3/1971 | Eisler | 165/223 |
| 3,920,953 | A | * | 11/1975 | Laing et al. | 392/343 |
| 4,035,608 | A | * | 7/1977 | Stromquist et al. | 219/218 |
| 4,141,187 | A | * | 2/1979 | Graves | 52/173.1 |
| 4,294,003 | A | * | 10/1981 | Coverstone | 29/611 |
| 4,354,091 | A | * | 10/1982 | Bain | 219/213 |
| 4,581,522 | A | * | 4/1986 | Graham | 219/545 |
| 4,952,775 | A | * | 8/1990 | Yokoyama et al. | 219/213 |
| 5,528,249 | A | * | 6/1996 | Gafford et al. | 343/704 |
| 6,278,909 | B1 | * | 8/2001 | Thibeault et al. | 700/286 |

FOREIGN PATENT DOCUMENTS

| FR | 2304616 | 10/1976 |
|---|---|---|
| GB | 2222616 | 3/1990 |

OTHER PUBLICATIONS

United Kingdom Search Report May 7, 2003.
Abstract of France 2304616.

* cited by examiner

*Primary Examiner*—Tu B Hoang
*Assistant Examiner*—Stephen J Ralis
(74) *Attorney, Agent, or Firm*—Ira S. Dorman

(57) ABSTRACT

The performance of a thermal insulation for a building surface 6, subject to a thermal gradient emitting from the building interior, is enhanced by a neutral thermal gradient. For this purpose an electrical heating element 1 is adapted to release very low Wattages of thermal energy and is contained within an inner layer 4 and an outer layer 5 of thermal insulation. Adjusting the thermal efficiency of the insulation layers controls the magnitude of the thermal energy required to maintain the temperature of the element 1 at the equivalent temperature level to the building interior. The element 1 may be provided with a moisture controller and discharge sizeable quantities of thermal energy to dry moisture from the thermal insulation materials of the assembly.

17 Claims, 2 Drawing Sheets

BUILDING INCORPORATING A THERMAL INSULATION ASSEMBLY AND METHOD OF CONSERVING ENERGY

TECHNICAL FIELD OF THE INVENTION

The present invention is related to a building incorporating a thermal insulation assembly and to a method of conserving energy.

BACKGROUND OF THE INVENTION

It is generally recognized that there is a global requirement to use more renewable energy, rather than energy from conventional fossil fuel sources. A difficulty with the use of natural energy forms, such as wind and solar energy, is their relatively low energy concentration and variable availability. In the context of buildings there are practical issues of scale for natural energy collectors, for instance wind turbines and solar PV (photovoltaic) panels. Taking as an example a residential property with either a 3 metre diameter wind turbine or 10 square metres of solar PV panels, the average electrical energy output would typically be in the range 200-400 Watts. Assuming the building has an outer surface area of 100 square metres then the available energy would be 2-4 Watts per square metre. This being a low wattage per square metre, it is therefore desirable to utilize the energy captured by these devices as efficiently as possible. One method is the release of the electrical energy in the form of heat.

It is well known from the study of thermodynamics that heat requires a temperature gradient to cross system boundaries. In the prior art, EP-A-0 049 790 discloses a method of using large quantities of low-grade energy to heat a building. The device warms the outside of a partition wall to a temperature between the building temperature and the atmospheric temperature. A thermal gradient is formed that reduces the flow of heat from the building. An air gap is used for insulation. EP-A-0 719 976 discloses a device using a heat gradient to reduce heat flows from a thermal mass. A metal plate, typically iron, has a lamination of a thin film of typically plastic material. The reference explains the combination creates a higher temperature in the lamination than the temperature of the thermal mass. The same device is revealed in EP-A-0 716 444 as providing a cooling effect.

Many insulation materials have been developed to insulate the walls, roofs and floors of buildings. Inorganic materials such as mineral fibres are in widespread use, as are organic materials such as foams. Typically these insulation materials are placed in buildings in a position adjacent to the outside surfaces of the structure. Generally the insulation layers are not in an airtight enclosure and are therefore indirectly exposed to moisture in the atmosphere. Indeed some materials may be intentionally exposed to the atmosphere using a technique described as 'breathing wall'. Under the circumstances described, temperature variations between the insulation enclosure and the atmosphere outside may cause condensation. This is more probable in the winter period during the time the thermal insulation properties are most required.

One disadvantage of this atmospheric exposure is that most insulation materials exhibit some hygroscopic tendencies. The absorption of water has a detrimental effect on the thermal insulation value of the material. For instance a dry mineral fibre with a thermal efficiency in terms of U value of 0.4 Watts per square metre per degree Kelvin may have a U value of 0.8 Watts per square metre per degree Kelvin at a 10% moisture content. Similarly a dry polyurethane foam with a U value of 0.3 Watts per square metre per degree Kelvin may have a U value of 0.4 Watts per square metre per degree Kelvin at a 10% moisture content. This represents a reduction in thermal performance that can be allowed for by increasing the thickness of the insulation material. In terms of constructing a building this creates problems of the increased space required for the insulation and the material cost. Generally insulation manufacturers provide moisture barriers as a method of reducing moisture absorption. Another problem is the effect of moisture absorption on the lifespan of insulation materials. It is well know that moisture ingress over time is an important factor in the deterioration of buildings. Most insulation materials have relatively short durability data, measured in terms of decades rather than the expected one hundred year life of a building.

Manufacturers of insulation products are supplying high efficiency insulation with U values typically in the range 0.01 to 0.02 Watts per square metre per degree Kelvin.

Utilizing an energy supply, providing low Wattages per square metre of building surface area, for heating applications is relatively difficult. In addition thermal insulation materials for buildings would operate at higher thermal efficiencies with the provision of a heat source to provide resistance to moisture absorption.

An aim of the present invention is to improve the thermal insulation of buildings by utilizing a neutral thermal gradient. A further aim is to maintain the thermal efficiency and integrity of the insulating material by controlling moisture absorption.

SUMMARY OF THE INVENTION

According to one aspect of the present invention there is provided a building incorporating a surface subject to a thermal gradient emitting from a building interior, to which is applied a thermal insulation assembly, wherein the thermal insulation assembly comprises: thermal insulation comprising first and second layers of insulation, one of the layers being positioned adjacent to the surface of the building; and an electrical heating element provided with means for connection to a source of electrical power and positioned within the thermal insulation between the first and second layers so as to extend substantially parallel to the surface.

According to another aspect of the present invention there is provided a method for conserving energy in a building incorporating a surface subject to a thermal gradient emitting from a building interior, comprising the step of applying to the surface a thermal insulation assembly, which thermal insulation assembly comprises: thermal insulation comprising first and second layers of insulation, one of the layers being positioned adjacent to the surface of the building; and an electrical heating element provided with means for connection to a source of electrical power and positioned within the thermal insulation between the first and second layers so as to extend substantially parallel to the surface.

In the specification the term 'electrical heating element' is intended to generically describe an electrical device, whereby electrical energy is converted into thermal energy herein referred to as heat. The term 'electrical energy source' describes any suitable source that may or may not be a renewable energy source. Similarly 'thermal insulation' generally describes any material or component that reduces the flow of heat and is suitable for building purposes.

In accordance with one specific aspect of a preferred embodiment of the invention, a thermal insulation assembly generally covers the external side of a building surface that is subject to a thermal gradient emitting from the building interior as a result of the temperature of the building interior being higher than that of the exterior atmosphere. An inner insulation layer is positioned between the interior of the building and the heating element.

Describing the operation of one preferred embodiment of the assembly from a cold start up: an electrical power source supplies energy to the heating element, at a rate equivalent to a very low Wattage per square metre of heating element, and the heating element is in contact with a thermal conductor that provides and even distribution of heat across the directional plane of the heating element. Heat is being released and flows into the inner and outer layers of thermal insulation. The insulation acts to restrain the flow of heat from the element and conductor. Restriction of the heat flow results in the temperature of the element and conductor increasing. A rising element and conductor temperature acts to cause an increase in the temperature level of a building surface, adjacent to and between the element and conductor and the building interior, as the heat contained within the building interior flows through the adjacent building surface and the assembly to the exterior, and is influenced by the escalating element and conductor temperature level. The rate of heat flow from the interior to the exterior is reducing as a result of the decreasing thermal gradient between the interior and element temperatures. A thermostatic controller acts to equalise the building interior temperature with the element temperature. When the temperature levels of the building interior, the adjacent building surface, the inner insulation layer and the element are equalised, then no thermal gradient occurs between the four zones. As heat requires a thermal gradient to flow, then under such a condition, a neutral thermal gradient is created that prevents the heat in the interior of the building flowing through the adjacent building surface into the inner insulation layer of the assembly. Likewise, heat flow from the element through the inner insulation layer to the adjacent building surface is prevented, thus preventing the electrical energy being supplied to the element providing heating to the building interior. Heat is flowing from the element through the outer insulation layer to the exterior atmosphere whenever a negative thermal gradient exists between these two zones. By this method, the assembly prevents heat outflow from the building interior and thereby improves the thermal insulation of the building interior.

In use, the optimum state is reached when the temperature of the element equals that of the building interior and heat flows are neutralized. A preferred feature is a thermostatic controller adapted to maintain a continuous thermal equilibrium between any changes in interior temperature and the element temperature and thereby provide economic control of the consumption of electrical energy by the element. The optimal method of operation is when electrical power is available on a constant basis and may be consumed whenever the element requires electrical energy.

In accordance with another preferred embodiment of the invention, the temperature of the building interior and the element are controlled using separate thermostatic controllers. The controllers are preset at the same temperature level so as to maintain equal temperatures between the two zones and thus produce a neutral thermal gradient to neutralise heat flow from the interior to the exterior.

In accordance with another embodiment of the invention, the insulation assembly may be operated using electrical power that is available on an intermittent basis from such electrical power sources as solar photo voltaic devices, wind turbines, combined heat and power equipment and fuel cells. Such power sources may be used individually or collectively.

In use, the heat flow from the building interior through the insulation assembly will be neutralized when the intermittent power sources have supplied sufficient energy to raise the element temperature to equal that of the building interior and create a neutral thermal gradient between two zones. Some intermittent power sources may not be controlled and may periodically supply excess power to the heating element. As a result, the temperature of the element may rise above that required to produce a neutral thermal gradient. The heat flow from the building interior through the insulation continues to be prevented, although the process is less thermally efficient than other embodiments as more heat is flowing to atmosphere than is necessarily required to produce a neutral thermal gradient.

In accordance with another preferred embodiment of the invention, the insulation assembly may be operated using one or more intermittent sources of power in combination with continuous power sources such as electricity grids to provide a constant availability of electrical power for the element. A load management system may be used for the purpose of combining the power sources.

The thermal insulation assembly may be provided on an exterior or interior face of the building surface. A building panel with cladding on the inner and outer faces may contain the assembly A window-glazing panel with inner and outer glass panes may be adapted to comprise the assembly.

The outer layer of insulation of the assembly may be of greater thickness than the inner layer.

The electrical heating element may be positioned in thermal contact with one or more thermal conductors.

Various thermal insulation materials, thermal insulation components, heat reflective films and coatings may be used in specific combinations to provide a high level of thermal efficiency. By adapting the number and relative dimensions of such components the outflow of heat from the element may be controlled. The first and/or second layer may comprise a plurality of specific insulation components.

Advantageously, the release of a very low Wattage of heat from the electrical heating element provides a means of generating a neutral thermal gradient, at typical building temperatures, when the element is contained within thermal insulation. The quantity of heat required has a relationship with the thermal efficiency of the insulation and the temperature of the exterior atmosphere, which can be determined empirically.

Advantageously, the release of electrical energy as heat within the insulation supplies the latent heat of evaporation for such atmospheric water as may be absorbed by the insulation material. This provides a means of preventing a reduction of thermal efficiency and a deterioration of material, due to moisture absorption.

BRIEF DESCRIPTION OF THE DRAWINGS

Other features of the invention will be apparent from the description of four preferred embodiments shown by way of example only in the accompanying drawings (not to scale) in which.

DESCRIPTION OF PREFERRED EMBODIMENTS

Figure 1:
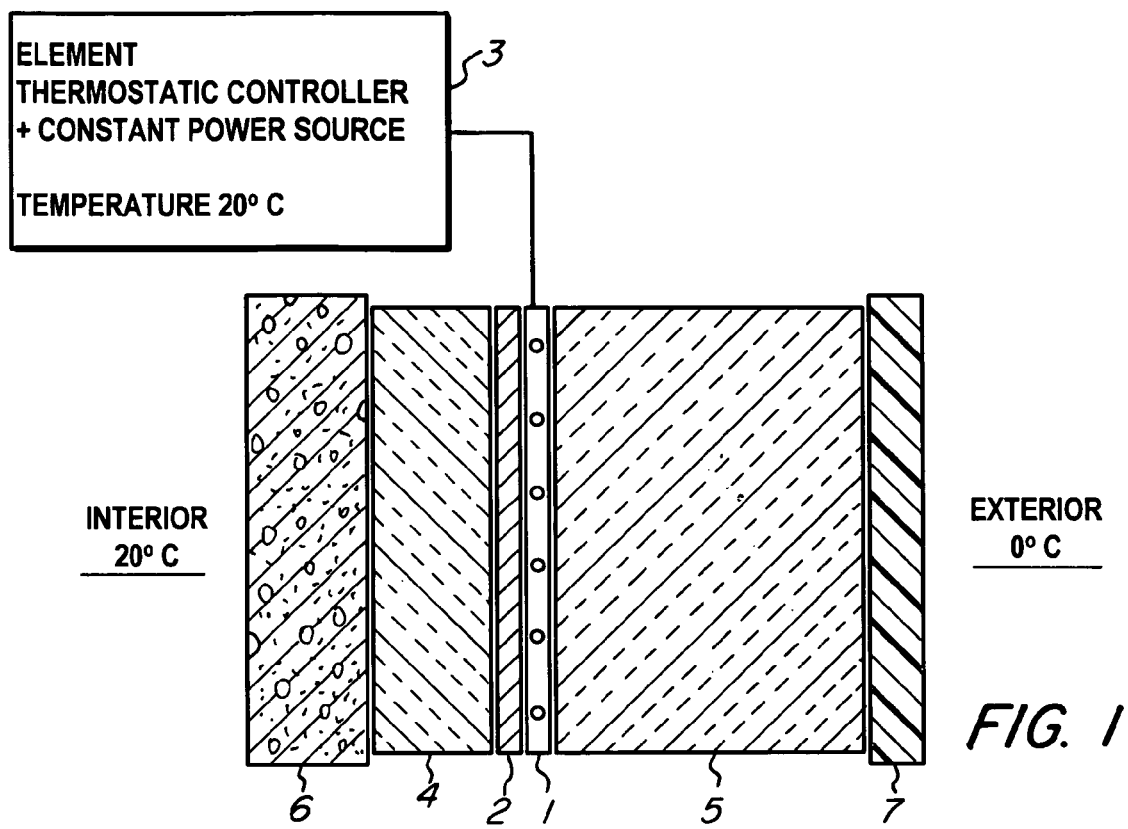
FIG. 1 is a cross section of the thermal insulation assembly juxtaposed to an outer side of a building wall and showing an exterior cladding.

FIG. 1 illustrates a thermal insulation assembly comprising an electrical heating element 1 positioned longitudinally within thermal insulation and in thermal contact with a thermal conductor 2 providing an even distribution of heat in the directional plane of the element 1. An aluminium sheet is used as the thermal conductor 2. An electrical connection is provided from the element 1 to a thermostatic controller 3 switching to a constant electrical power source. An inner layer 4 and an outer layer 5 of thermal insulation thermally insulate the element 1. The insulating effectiveness of the inner layer 4 provides sufficient thermal isolation for the element 1 to be thermostatically controllable. The outer layer 5 is of high efficiency thermal insulation typically providing a U value in the range 0.400 to 0.005 Watts per square metre per degree Kelvin. The element 1 may be of any suitable kind, converting electrical energy into thermal energy and generally having an output of not more than 20 Watts per square metre for the purpose of generating a neutral thermal gradient. As is well understood, a thermal mass at a temperature above that of the atmosphere produces a temperature gradient that drives heat flow, and accordingly the heating element 1 and thermal conductor 2 are arranged in a generally parallel plane to a surface of a building wall 6 in accordance with the known principles of thermal insulation.

As illustrated, the inner insulation layer 4 adjoins the conductor 2 and is juxtaposed to an outer side of a building wall 6. The gap between the inner layer 4 and the building wall 6 should generally be as small as possible, in an airtight configuration. The element 1 is in thermal contact with the conductor 2 and adjoins the outer layer 5 and the exterior surface thereof is protected by weatherproof cladding 7. The cladding 7 is of any suitable kind to provide weather protection and may be a structural part of the building.

When the operation of the assembly starts, the temperature of the building interior is higher than that of the insulation assembly. The heating element 1 is connected to an electrical power source and supplies heat at a very low Wattage per square metre of assembly. The thermal conductor 2 assists with the uniform distribution of heat in the directional plane of the element 1. The inner layer 4 and the outer layer 5 of thermal insulation act on the element 1 and conductor 2 to constrain the outflow of the heat being released. As a consequence the temperature of the element 1 rises and is governed by the thermostatic controller 3 to equal the temperature level of the building interior. During the time the temperature of the element 1 is rising, the heat in the building interior is flowing out through the wall 6 and assembly to the exterior atmosphere. Heat flowing from the interior provides the heat to raise the temperature level of the wall 6, as a result of the escalating temperature level of the element 1 within the assembly. The rate of heat flow from the interior to the exterior is reducing as a result of the declining thermal gradient between the interior and the element 1. When the temperature of the wall 6, the inner layer 4 and the element 1 equalize with the temperature of the building interior, a neutral thermal gradient is produced. As a result of the neutralization of the thermal gradient between the interior and the element 1, the outflow of heat from the interior of the building through the wall 6 and into the inner layer 4 of the assembly is prevented. Likewise, heat from the element 1 is prevented from flowing through the inner layer 4 to the wall 6, and thus the electrical energy being supplied to the element 1 provides no heating through the wall 6 to the building interior. Heat is flowing from the element 1 and the thermal conductor 2 and out through the outer layer 5 and cladding 7 to atmosphere whenever the heat of the element 1 and conductor 2 is influenced by a negative thermal gradient to the exterior atmosphere. In this way, a low Wattage of heat within the assembly is used to prevent heat outflow from the building interior and thereby enhance the thermal insulation of the building interior and wall 6.

When the temperature of the building interior is higher than the element 1, the thermostatic controller 3 increases the temperature of the element 1 to the equivalent temperature of the interior. The temperature rise of the wall 6 lags behind the interior temperature and the rate of temperature increase of the wall 6 is a function of the thermal mass of the wall and the temperature gradient. The thermostatic controller 3 is programmed to compensate for the delay in temperature changes passing through the wall 6 and reaching the element 1. Likewise, when the temperature level of the building interior is falling, the thermostatic controller 3 is programmed to allow for the heat retention by the wall 6.

Referring to FIG. 1, the neutral thermal gradient is shown as the interior (shown generally) and the element 1 being at twenty degrees Celsius. The exterior atmospheric temperature is shown as being zero degrees Celsius.

Figure 2:
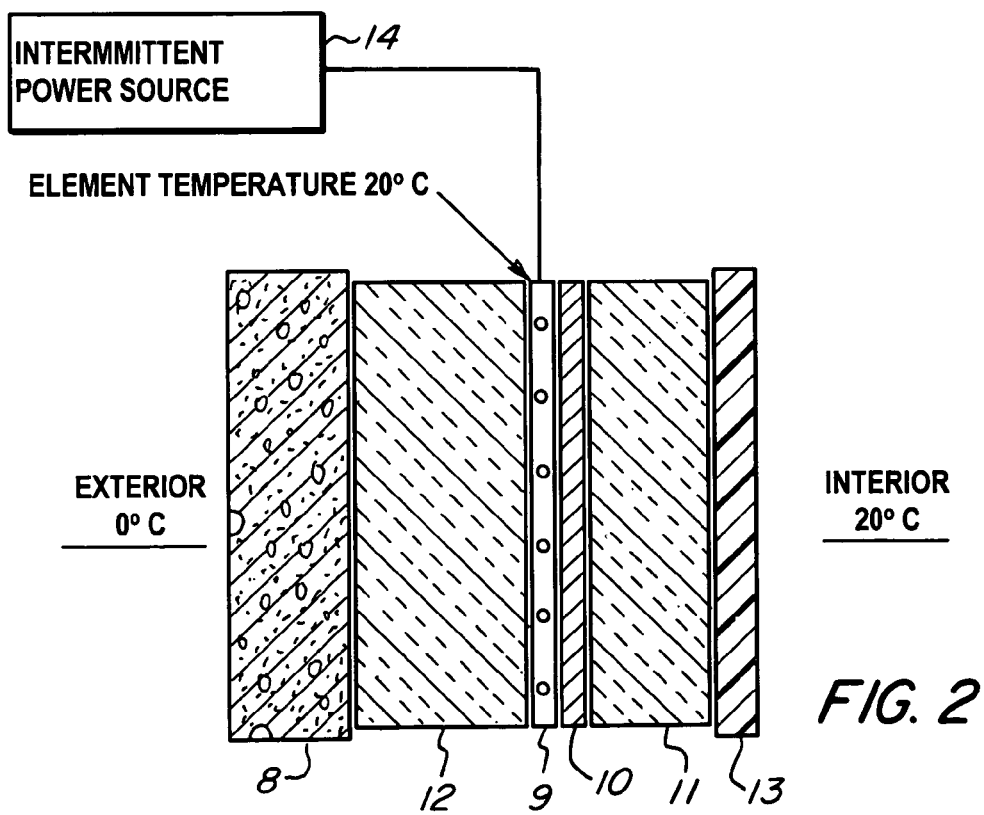
FIG. 2 is a cross section of the thermal insulation assembly juxtaposed to an inner side of a building wall and showing an interior partition.

An alternative embodiment is illustrated in FIG. 2, and is particularly adapted for use where the building wall 8 is required to be exposed to atmosphere and internal insulation is provided. The arrangement is generally as in FIG. 1, the heating element 9 being positioned in contact with a thermal conductor 10 and provided with an inner layer 11 and an outer layer 12 of thermal insulation. High efficiency insulation is used for the inner layer 11 and outer layer 12 so as to minimize the thickness of the internal insulation. The outer layer 12 is juxtaposed with the inner side of a building wall 8 in a generally airtight configuration. An interior partition 13 provides protection for the assembly. The element 9 is connected to an intermittent power source 14.

It will be appreciated that the principle of operation of this embodiment is the same as that of FIG. 1, in that electrical power provided to the heating element 9 is used to produce a neutral thermal gradient and thereby heat outflow from the building interior through the partition 13 into the inner layer 11 of the assembly is prevented. The element 9 is connected to an intermittent power source 14 suitable for supplying sufficient energy to raise the temperature of the element 9 to be equal to that of the interior temperature. In FIG. 2, when sufficient heat is supplied to the element 9 such that the temperature of the element 9 reaches 20 degrees Celsius and equalizes with the interior temperature of 20 degrees Celsius, heat flow from the building interior to the exterior is neutralized as a result of a neutral thermal gradient being established. Heat is flowing from the element 9 and conductor 10 and out through the outer layer 12 and wall 8 to atmosphere whenever the heat of the element 9 and conductor 10 is influenced by a negative thermal gradient to the exterior.

FIG. 2 illustrates the neutral thermal gradient condition as the interior (shown generally) and the element 9 being at twenty degrees Celsius, with the atmosphere exterior to the wall 8 being at zero degrees Celsius.

Figure 3:
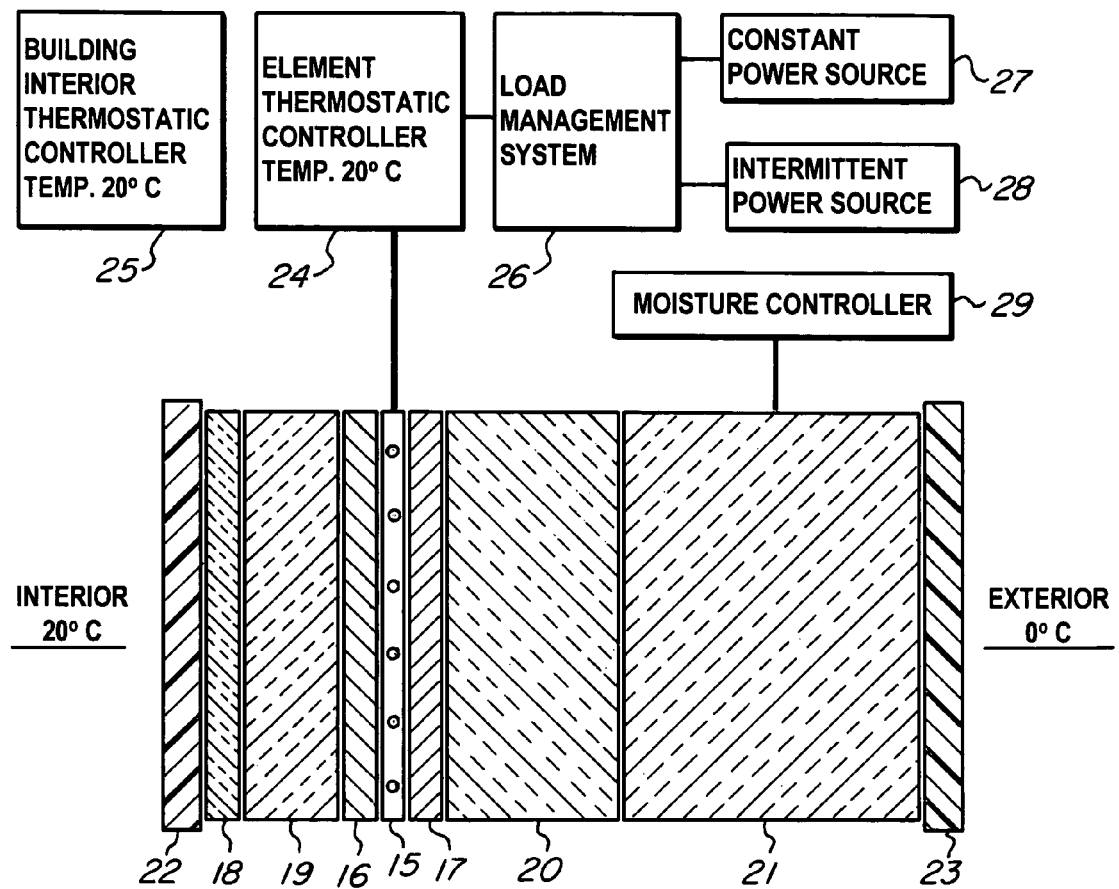
FIG. 3 is a cross section of the thermal insulation assembly contained within two sections of cladding material.

An alternative embodiment is illustrated in FIG. 3, and is particularly suited to buildings constructed from panels of cladding materials. The arrangement is generally as in FIG. 1, the heating element 15 being in thermal contact with and positioned between two thermal conductors 16 and 17 and provided with two inner layers 18 and 19 and two outer layers 20 and 21 of thermal insulation. The inner layer 18 comprises a material with acoustic and thermal insulation properties. An inner cladding 22 and an outer cladding 23, in a generally airtight configuration, provide protection for the assembly.

The principle of operation of this embodiment is the same as that of FIG. 1, in that electrical power provides the heating element 15 with energy in the form of heat, and the heat being released from the element 15 and via conductors 16 and 17 is distributed parallel to the interior surface and is used to provide a neutral thermal gradient. Thereby heat flow from the interior through the inner cladding 22 and inner insulation layers 18 and 19 is prevented. In FIG. 3, the equalization of the interior temperature and element temperature 15 is arranged by presetting to 20 degrees Celsius a thermostatic controller 24 for the element 15 and a thermostatic controller 25 for the building interior. The element 15 is connected via the thermostatic controller 24 to a load management system 26 that provides electrical power by combining a constant power source 27 with an intermittent power source 28. Heat is flowing from the element 15 and conductor 17 and out through the outer layers 20 and 21 and cladding 23 to atmosphere, whenever the heat of the element 15 is influenced by negative thermal gradient to the exterior. A moisture controller 29, suitable for measuring moisture levels, has probes (not shown) positioned within the outer insulation layer 21 and periodically controls the release of heat from the element 15 during a drying cycle.

FIG. 3 illustrates the neutral thermal gradient condition as the interior (shown generally) and the element 15 being at twenty degrees Celsius, with the atmosphere exterior to the cladding 23 being at zero degrees Celsius.

Figure 4:
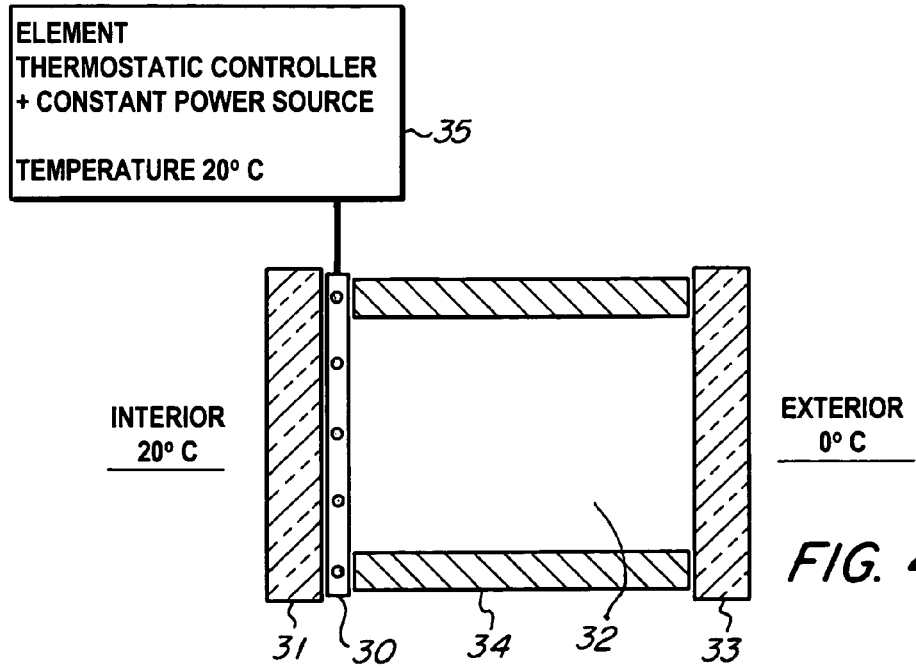
FIG. 4 is a cross section of the thermal insulation assembly incorporated within two glass panes.

An alternative embodiment is illustrated in FIG. 4 and is applicable to window panels for buildings, the panels having two or more glass panes. The arrangement is generally as in FIG. 1, the heating element 30 being in the form of a translucent coating suitable for releasing heat and mounted onto the inner glass pane 31 on the face of the pane within the panel cavity. The thermal insulation property of the inner glass pane 31 is adapted to provide sufficient thermal isolation for the element 30 to be thermostatically controllable. An air gap 32 between the inner pane 31 and outer pane 33 acts as the outer layer of thermal insulation for the element 30. A glazing bar 34 is generally positioned around the perimeter of the panel to act as an airtight seal and separate the inner pane 31 from the outer pane 33. The element 30 is connected to a thermostatic controller 35 suitable for maintaining thermal equilibrium between the building interior temperature and element 30, switching to a constant power source.

The principle of operation of the embodiment of FIG. 4 is the same as in FIG. 1 in that electrical power provided to the element 30 is used to release heat to produce a neutral thermal gradient and thereby heat outflow from the interior through the inner glass pane 31 is prevented. A thermostatic controller 35 provides economic control of the consumption of power by the element by maintaining equal temperature levels between the building interior and element 30. Heat is flowing from the element 30 and out through the air gap 32 and outer pane 33 whenever the heat of the element 30 is influenced by a negative thermal gradient to the exterior atmosphere.

In FIG. 4 the neutral thermal gradient condition is shown as the interior (shown generally) and element 30 being at twenty degrees Celsius, with atmosphere exterior to the outer pane 33 being at zero degrees Celsius.

It will be appreciated that the kind of insulation, the properties of the insulation and many other variable features are matters of routine design and can be determined empirically or by calculation to suit circumstances at the installation site. In the same way thermal insulation features of any conventional kind may be added to improve energy conservation.

One or more layers of thermally conductive material in thermal contact with the heating element may be provided, so as to ensure a uniform distribution of heat in a generally parallel plane to the surface being insulated. The conductive material may be any material suitable for conducting heat from a heating element at typical building temperatures.

As is well known, warm air is in motion and rises upwards, resulting in higher temperatures in the upper region of the building interior. The practical application of thermostatic controllers to produce a neutral thermal gradient between the building interior and heating element is a matter of routine design and can be determined empirically or by calculation to suit circumstances at the installation site.

The device according to the invention may also include means to deploy the element as a drying mechanism for such hygroscopic materials as the insulation is comprised from, so as to ensure high thermal efficiencies in damp atmospheric conditions. It is envisaged that a moisture measurement device may be provided for this purpose, and that in operation the element may release quantities of thermal energy in excess of 20 Watts per square metre in order to evaporate moisture absorbed by the insulation materials.

I claim:

1. A building incorporating a surface subject to a thermal gradient emitting from a building interior, to which is applied a thermal insulating assembly, wherein the thermal insulating assembly comprises: thermal insulation comprising first and second layers of insulation, one of the first and second layers of insulation being positioned adjacent to the surface of the building; and an electrical heating element provided with means for connection to a source of electrical power and positioned within the thermal insulation between the first and second layers so as to extend substantially parallel to the surface; said building additionally including first and second thermostatic controllers, said first thermostatic controller being operatively connected to determine the temperature of said electrical heating element and said second thermostatic controller being operatively connected to determine the temperature of the building interior, said first and second thermostatic controllers being programmed to cause said electrical heating element to increase in temperature so as to equalize with, and not exceed, the temperature of the interior of the building and thereby to establish and maintain a neutral temperature gradient between the building interior and said electrical heating element, said neutral temperature gradient preventing heat outflow from the building interior through the thermal insulating assembly, preventing heat flow from said electrical heating element to the building interior, through the inner of said first and second layers of insulation, relative to the building interior, solely through the outer of said first and second layers of said insulation, relative to the building interior, to the exterior atmosphere.

2. A building as claimed in claim 1, wherein the thermal insulation assembly is provided on an exterior face of the surface.

3. A building as claimed in claim 1, wherein the thermal insulation assembly is provided on an interior face of the surface.

4. A building as claimed in claim 1, wherein the one of the first and second layers that is outermost on the building is of greater thickness than the other of the first and second layers.

5. A building as claimed in claim 1, wherein the first layer comprises a plurality of specific insulation components.

6. A building as claimed in claim 1, wherein the second layer comprises a plurality of specific insulation components.

7. A building as claimed in claim 1, wherein the electrical heating element is positioned in thermal contact with at least one thermal conductor.

8. A building as claimed in claim 1 and including a load management system that provides electrical power by combining a constant power source with an intermittent power source.

9. A method of conserving energy in a building incorporating a surface subject to a thermal gradient emitting from a building interior, comprising the steps of:
  applying to the surface a thermal insulating assembly, which thermal insulating assembly comprises: thermal insulation comprising first and second layers of insulation, one of the layers being positioned adjacent to the surface of the building;
  and an electrical heating element provided with means for connection to a source of electrical power and positioned within the thermal insulating assembly between the first and second layers so as to extend substantially parallel to the surface;
  providing first and second thermostatic controllers, the first thermostatic controller being operatively connected to determine the temperature of the electrical heating element and the second thermostatic controller being operatively connected to determine the temperature of the building interior; and
  energizing the electrical heating element under the control of the first and second thermostatic controllers so as to raise the temperature of the electrical heating element to equalize with, and not exceed, the temperature of the interior of the building and thereby to establish and maintain a neutral temperature gradient between the building interior and the electrical heating element so as to thereby prevent heat outflow from the building interior through the thermal insulating assembly, prevent heat flow from the electrical heating element to the interior of the building, through the inner of said first and second layers of insulation, relative to the building interior, solely through the outer of said first and second layers of insulation, relative to the building interior, to the exterior atmosphere.

10. A method according to claim 9, wherein the thermal insulation assembly is provided on an exterior face of the surface.

11. A method according to claim 9, wherein the thermal insulation assembly is provided on an interior face of the surface.

12. A method according to claim 9, wherein the one of the first and second layers that is outermost on the building is of greater thickness than the other of the first and second layers.

13. A method according to claim 9, wherein the first layer comprises a plurality of specific insulation components.

14. A method according to claim 9, wherein the second layer comprises a plurality of specific insulation components.

15. A method according to claim 9, wherein the electrical heating element is positioned in thermal contact with at least one thermal conductor.

16. A method according to claim 9 wherein thermal equilibrium between the building interior and the heating element is maintained thermostatically.

17. A method according to claim 9 and including the step of providing electrical power by means of a load management system that combines a constant power source with an intermittent power source.

* * * * *

UNITED STATES PATENT AND TRADEMARK OFFICE
CERTIFICATE OF CORRECTION

PATENT NO. : 7,576,301 B2  Page 1 of 1
APPLICATION NO. : 10/952507
DATED : August 18, 2009
INVENTOR(S) : Christopher Norman Gaskell It is certified that error appears in the above-identified patent and that said Letters Patent is hereby corrected as shown below:

In Claim 1, column 8, line 52, insert the phrase --and permitting heat flow-- before the word "solely."

In Claim 9, column 10, line 6, insert the phrase --and permit heat flow-- before the word "solely."

Signed and Sealed this

First Day of December, 2009

David J. Kappos
*Director of the United States Patent and Trademark Office*